United States Patent [19]

Werner et al.

[11] Patent Number: 4,952,043
[45] Date of Patent: Aug. 28, 1990

[54] SIZE ADJUSTABLE GLASSES SUN SHADE

[76] Inventors: Peter J. Werner, 6300 Tropicana #199, Las Vegas, Nev. 89103; Timothy T. Werner, 940 Yarger Dr., Cincinnati, Ohio 45230

[21] Appl. No.: 371,277

[22] Filed: Jun. 26, 1989

[51] Int. Cl.⁵ .............................................. G02C 9/00
[52] U.S. Cl. ........................................ 351/47; 351/48
[58] Field of Search ...................... 351/44, 47, 48, 158

[56] References Cited

U.S. PATENT DOCUMENTS 2,574,749 11/1951 Mendelsohn .
2,616,082 11/1952 Creighton .
2,949,609 8/1960 Sager .
3,604,013 9/1971 Hammond .
3,901,589 8/1975 Bienenfeld .

Primary Examiner—Paul M. Dzierzynski
Attorney, Agent, or Firm—Fleit, Jacobson, Cohn, Price, Holman & Stern

[57] ABSTRACT

A sun shade is provided for a pair of glasses including right and left hand panel structures for disposition immediately forward of the right and left hand lenses of the glasses and the panel structures are guidingly supported relative to each other for movement toward and away from each other. Biasing means is connected between the panel sections for biasing the latter toward each other and remote portions of the panel structure include upstanding, tensioned elastic members which may have their vertical mid-portions deflected apart by the temples of the associated glasses rearward of the pivot axes thereof and the upper margins of the panel sections include rearwardly projecting support flange sections for overlying the right and left hand portions of the associated glasses. The support flange sections support the weight of the sun shade from the glasses and the elastic members enjoy a non-slip frictional engagement with the glasses temples to not only prevent forward displacement of the sun shade relative to the glasses but to also exert inward biasing forces on the glasses temples rearward of the pivot axes thereof such that the grip of the temples on the head of the wearer of the glasses is increased to compensate for the additional weight of the sun shade supported from the glasses.

16 Claims, 1 Drawing Sheet

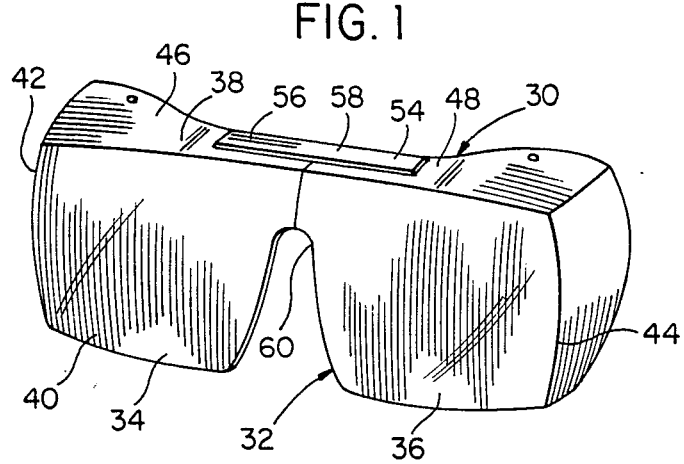
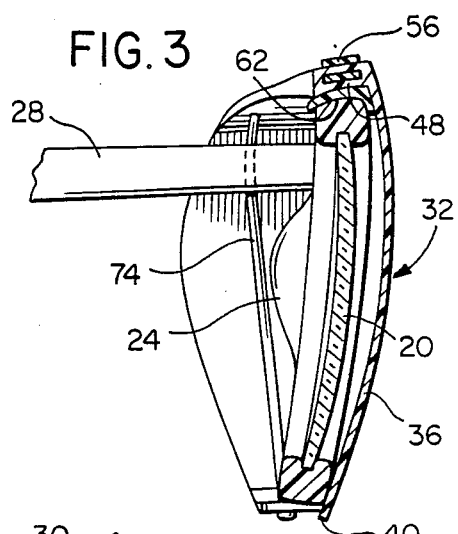
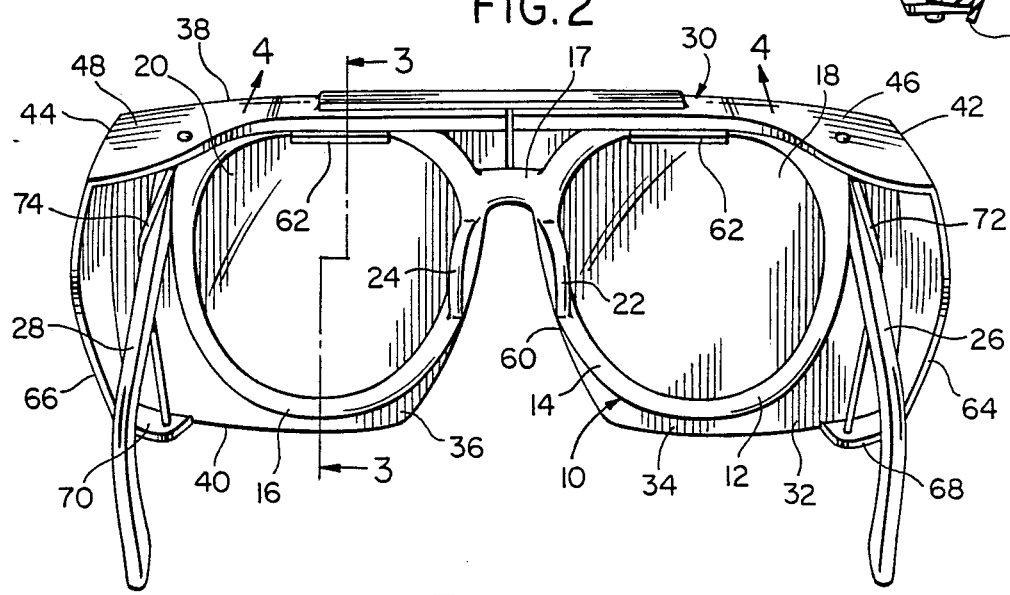
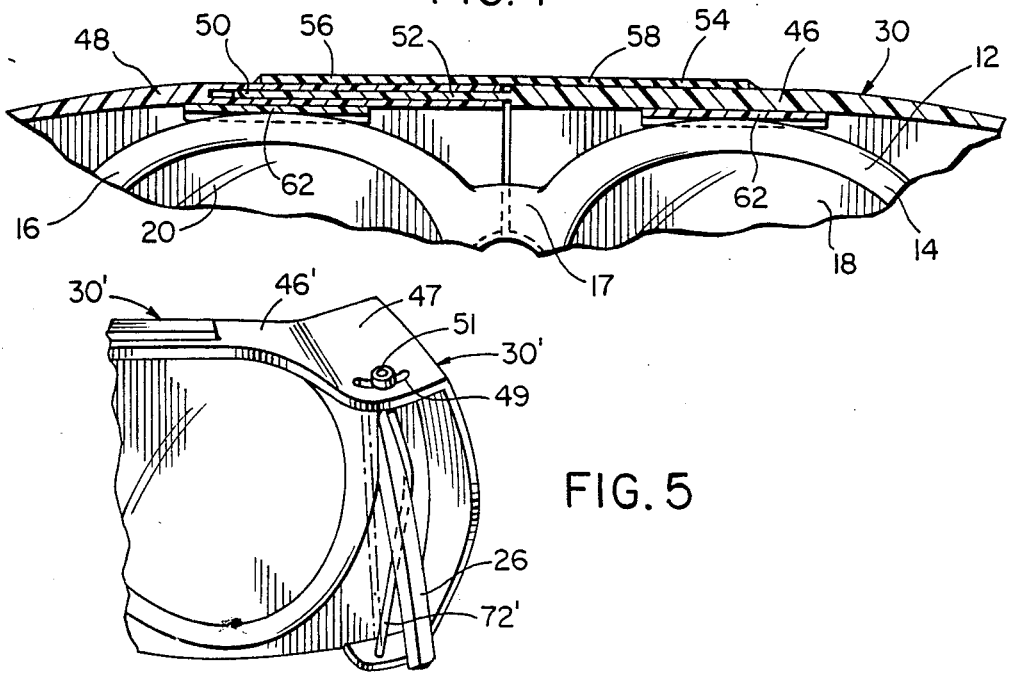

SIZE ADJUSTABLE GLASSES SUN SHADE

BACKGROUND OF THE INVENTION

1. FIELD OF THE INVENTION

This invention relates to a sun shade incorporating a tinted panel structure for support from and disposition immediately forward of a pair of glasses with the sun shade being structured such that it may be readily securely supported and removed from different sizes and styles of glasses with one hand and independent of clip or clamp structures, which might abrade or scratch glasses frames and/or lenses and require adjustment by hand tools, and in a manner such that the mounting of the sun shade from a pair of glasses automatically will apply inward pressure to the rear ends of the glasses temples or increase the inward pressure exerted by the rear ends of the temples on the head of the user to thereby increase the holding power of the glasses on the head of the user and compensate for the slight additional weight added to the glasses by the sun shade.

DESCRIPTION OF RELATED ART

Various different forms of sun shades and the like heretofore have been provided for use in conjunction with conventional glasses and these sun shades and the like have utilized many different structures for support thereof from an associated pair of glasses. Examples of previously known sun shades including some of the general structural and operational features of the instant invention are disclosed in U.S. Pat. Nos. 2,574,749, 2,616,082, 2,949,609, 3,604,013 and 3,901,589. However, these previously known forms of sun shades for glasses do not include the support structure incorporated in the sun shades of the instant invention for supporting the sun shade from an associated pair of glasses independent of the style and size of the glasses and further do not include structure whereby the application of the previously known sun shades to glasses automatically provides or increases inward pressure by the rear ends of the glasses temples upon the head of the wearer of the glasses to automatically compensate for the additional weight of the sun shades.

SUMMARY OF THE INVENTION

The sun shade of the instant invention is constructed in two halves and adjustable in width to accommodate glasses of different sizes and is thus similar to the structure disclosed in U.S. Pat. No. 2,616,082. The sun shade further includes an upper support flange structure for engagement over the upper portion of the associated sun glasses and is thus similar to the auxiliary sun glasses disclosed in U.S. Pat. No. 2,949,609.

However, the sun shade of the instant invention is automatically adjustable to the size of the associated glasses and further is readily operatively associated with a pair of glasses without the use of tools. In addition, the sun shade, when mounted upon an associated pair of glasses, automatically compensates for the additional weight of the sun shade by increasing existing inward spring pressure on the temples of the associated glasses or applying inward pressure to the temples of the associated glasses if inward pressure was not previously applied by the glasses temples.

The main object of this invention is to provide a sun shade attachment for conventional glasses and which may be applied to an associated pair of glasses without the use of tools and without the use of spring clips.

Another object of this invention is to provide a sun shade attachment for glasses which is in the form of a goggles lens assembly.

Still another important object of this invention is to provide a sun shade for glasses which will automatically compensate for different size glasses.

Another object of this invention is to provide a sun shade for glasses which will automatically compensate for the additional weight of the sun shade by applying or increasing inward pressure of the temples of the glasses upon the head of the wearer of the glasses.

A final object of this invention to be specifically enumerated herein is to provide a sun shade for glasses which will conform to conventional forms of manufacture, be of simple construction and easy to install so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a front perspective view of a first form of sun shade constructed in accordance with the present invention;

FIG. 2 is a rear perspective view of a conventional form of eye glasses with the first form of sun shade operatively associated therewith;

FIG. 3 is an enlarged fragmentary vertical sectional view taken substantially upon the plane indicated by the section line 3—3 of FIG. 2;

FIG. 4 is a fragmentary enlarged vertical sectional view taken substantially upon the plane indicated by the section line 4—4 of FIG. 2; and FIG. 5 is a fragmentary rear perspective view of the right side of a conventional pair of glasses having a second form of the sun shade operatively associated therewith.

DESCRIPTION OF THE PREFERRED EMBODIMENTS

Referring now more specifically to the drawings the numeral 10 generally designates a pair of conventional glasses including a frame 12 having right and left portions 14 and 16 interconnected by a bridge 17 and wherein each of the right and left portions 14 and 16 defines an open frame portion, the bridge 17 extending between the frame portions 14 and 16.

The portions 14 and 16 support glasses lenses 18 and 20 therefrom as well as nose pads 22 and 24. Finally, the remote upper corner portions of the frame portions 14 and 16 have the forward ends of a pair of rearwardly extending temples 26 and 28 pivotally supported therefrom in the usual manner (not shown). Accordingly, the glasses 10 comprise one type of conventional glasses.

A first form of sun shade constructed in accordance with the present invention is referred to in general by the reference numeral 30 and includes a horizontally elongated upright transparent panel structure 32 incorporating right and left half panel sections 34 and 36.

The panel structure 32 defines upper and lower margins 38 and 40 and opposite side margins 42 and 44. The upper margin 38 includes rearwardly projecting support flange means in the form of support flange sections 46 and 48 carried by the sections 34 and 36 and the support flange section 48 defines an outwardly opening blind recess 50 while the support flange section 46 defines an outwardly projecting shank 52 slidingly and telescopingly received within the recess 50, thereby guidingly supporting the panel sections 34 and 36 for movement toward and away from each other.

The opposite end portions 54 and 56, only, of an elongated elastic member 58 are secured to the support frame sections 46 and 48, respectively, and yieldingly bias the panel sections 34 and 36 toward each other, the panel sections 34 and 36 together defining a downwardly opening central notch 60 opening downwardly through the central portion of the lower margin 40 and being provided for receiving the nose of the wearer of the glasses 10 therein.

The support flange sections 46 and 48 are slightly rearwardly and downwardly inclined generally 10° so as to define an included angle of generally 80° between the support flange sections 46 and 48 and the panel structure 32. In addition, the central portions of the support flange sections 46 and 48 have non-slip friction pads 62 secured thereunder for frictional engagement with the upper margins of the frame portions 14 and 16.

The remote ends of the panel sections 34 and 36 include rearwardly directed panels 64 and 66 supported therefrom and the remote ends, of the lower margin 40 include rearwardly projecting flange or flange portions 68 and 70. In addition, a pair of elongated, upstanding, flexible and elastic retaining members 72 and 74 have their lower ends anchored relative to the flanges 68 and 70 and their upper ends anchored relative to the support flange sections 46 and 48, the retaining members 72 and 74 being spaced sufficiently rearward of the panel sections 34 and 36 to be disposed appreciably rearward of the pivot axes (not shown) of the temples 26 and 28 relative to the frame portions 14 and 16. In addition, from FIG. 2 of the drawings, it may be seen that the upper and lower ends of the retaining members 72 and 74 are anchored relative to the sun shade 30 appreciably inward of the forward ends of the temples 26 and 28 and that the mid-portions of the retaining members 72 and 74 are thus bowed outwardly away from each other in order to pass over the outside surfaces of the forward end portions of the temples 26 and 28. Therefore, inasmuch as the retaining members 72 and 74 are under longitudinal tension, the elasticity of the retaining members 72 and 74 tends to inwardly swing the rear ends of the temples 26 and 28 toward each other in order to apply inward pressure by the rear ends of the temples 26 and 28 on the head of the wearer of the glasses 10. In addition, the retaining members 72 and 74 include non-slip frictional surfaces thereof engaged with the temples 26 and 28 and thereby also function to prevent forward displacement of the sun shade 30 relative to the glasses 10, particularly if the portions of the retaining members 72 and 74 engaged with the temples 26 and 28 are displaced rearward relative to a plane containing the upper and lower extremities of the retaining members 72 and 74, see FIG. 3.

The sun shade 30 is of course constructed of transparent material which has been tinted, although the sun shade 30 may be otherwise treated to filter light passing therethrough or the sun shade 30 may be at least substantially untinted and used solely as protective gear if the sun shade 30 is constructed of high impact resistant material. The sun shade 30 may protect not only the eyes of the wearer, but also eyeglasses worn by the user and the sun shade 30 may be used by painters, home hobyists, do-it-yourselfers, dental hygienists and light industry workers, etc. It is also envisioned that the sun shade 30 might be so treated as to be usable as a pair of lightweight goggles for welders to protect the eyes of welders from the high intensity light which occurs during arc welding procedures.

With attention now invited more specifically to FIG. 5, a modified form of sun shade is referred to in general by the reference numeral 30'. The sun shade 30' is substantially identical in construction to the sun shade 30 and therefore has the various components thereof designated by prime numerals corresponding to the numerals designating the components of the sun shade 30.

The sun shade 30' differs from the sun shade 30 in that the remote ends of the support flange sections corresponding to the support flange sections 44 and 46 are turned upwardly as at 47 and have arcuate slots 49 formed therein through which the upper ends of the retaining members corresponding to the retaining members 72 and 74 are slidingly received and secured by slidable enlargements 51. The upturned angulation at 47 enables the corresponding slidable enlargements 51, due to the tension of the corresponding retaining members, to slide inwardly along the slots 49 and to thus exert further inward pressure on the rear ends of the associated temples 26.

It will be noted that the rearwardly directed portions 64 and 66 could be formed separately from the support flange sections 46 and 48 and the flanges 68 and 70 and be pivotally mounted from the side margins 42 and 44 of the panel sections 34 and 36 to thus enable the sun shade 30 to be folded into a more compact state.

In any event, the second form of sun shade 30' illustrated in FIG. 5 functions in generally the same manner as the sun shade 30 illustrated in FIGS. 1-4. Also, it is to be noted that the panel sections 34 and 36 could be mounted for guided movement toward and away from each other by means other than the blind recess 50 and shank 52.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A size adjustable sun shade for glasses of the type including front and rear sides, top and bottom margins and upright opposite side margins as well as elongated, rearwardly projecting opposite side temples pivoted at their forward ends from corresponding opposite side margins of said glasses for swinging movement into lengthwise overlapped positions extending across and closely paralleling said rear side, said sun shade including a horizontally elongated upright transparent panel structure including front and rear surfaces, upper and lower margins and opposite side margins, said panel structure including rearwardly projecting support flange means extending along and projecting rearwardly from said upper margin for overlying and being supported by said top margin when said panel structure is disposed closely forward of said front side, at least the opposite ends of said lower margin including rearwardly projecting flange means supported therefrom closely adjacent said side margins of said transparent panel structure, and a pair of upstanding elongated flexible and elastic retaining members adjacent and rearward of said side margins of said transparent panel structure each having a lower end thereof anchored relative to the corresponding flange means and an upper end thereof anchored relative to the corresponding end portion of said support flange means, said retaining members being spaced sufficiently rearward of said rear surface to be engaged over the remote sides of said temples closely rearward of the pivot axes thereof.

2. The sun shade of claim 1 wherein said opposite side margins include rearwardly directed panels supported therefrom extending rearwardly from said side margins to points spaced rearwardly of said retaining members, said rearwardly directed panels being disposed outwardly of the remote sides of said retaining members.

3. The sun shade of claim 1 wherein said support flange means includes downwardly facing friction surface means for non-slip friction engagement with said top margin.

4. The sun shade of claim 1 wherein said support flange means is rearwardly and downwardly inclined relative to said panel structure and defines an included angle therewith of generally 80°.

5. The sun shade of claim 1 wherein said upright transparent panel structure includes right and left substantially coextensive half panel sections each including a corresponding support flange section of said support flange means, said half panel sections including elongated guide portions thereof extending longitudinally of said panel structure and disposed in lengthwise lapped guiding engagement with each other for relative shifting of said half panel sections toward and away from each other between retracted limit positions and extended positions, and force means operably connected between said half panel sections yieldingly biasing said half panel sections toward said retracted limit position.

6. The sun shade of claim 1 wherein said retaining members, at least in the areas thereof engageable with said temples, include friction surface means for non-slip frictional engagement with said temples.

7. The sun shade of claim 6 wherein said opposite side margins include rearwardly directed panels supported therefrom extending rearwardly from said side margins to points spaced rearwardly of said retaining members, said rearwardly directed panels being disposed outwardly of the remote sides of said retaining members.

8. The sun shade of claim 7 wherein said support flange means includes downwardly facing friction surface means for non-slip friction engagement with said top margin.

9. The sun shade of claim 8 wherein said support flange means is rearwardly and downwardly inclined relative to said panel structure and defines an included angle therewith of generally 80°.

10. The sun shade of claim 9 wherein said upright transparent panel structure includes right and left substantially coextensive half panel sections each including a corresponding support flange section of said support flange means, said half panel sections including elongated guide portions thereof extending longitudinally of said panel structure and disposed in lengthwise lapped guiding engagement with each other for relative shifting of said half panel sections toward and away from each other between retracted limit positions and extended positions, and force means operably connected between said half panel sections yieldingly biasing said half panel sections toward said retracted limit position.

11. In combination with glasses of the type including front and rear sides, top and bottom margins and upright opposite side margins as well as elongated, rearwardly projecting opposite side temples pivoted at their forward ends from corresponding opposite side margins of said glasses for swinging movement into lengthwise overlapped positions extending across and closely paralleling said rear side, a size adjustable sun shade including a horizontally elongated upright transparent panel structure incorporating front and rear surfaces, upper and lower margins and opposite side margins, said panel structure including rearwardly projecting support flange means extending along and projecting rearwardly from said upper margin for overlying and being supported by said top margin when said panel structure is disposed closely forward of said front side, at least the opposite ends of said lower margin including rearwardly projecting flange means supported therefrom closely adjacent said side margins of said transparent panel structure, and a pair of upstanding, elongated flexible and elastic retaining members adjacent and rearward of said side margins of said transparent panel structure each having a lower end thereof anchored relative to the corresponding flange means and an upper end thereof anchored relative to the corresponding end portion of said support flange means, said retaining members being spaced sufficiently rearward of said rear surface to be engaged over the remote sides of said temples rearward of the pivot axes thereof when said sun shade is disposed immediately forward of said glasses with said support flange means overlying and supported from said top margin.

12. The glasses and sun shade combination of claim 11 wherein said retaining members, at least in the areas thereof engageable with said temples, include friction surface means for non-slip frictional engagement with said temples, said opposite side margins each including a rearwardly directed panel supported therefrom extending rearwardly from said side margins to points spaced rearwardly of said retaining members, said rearwardly directed panels being disposed outward of the remote sides of said retaining members.

13. The glasses and sun shade combination of claim 12 wherein said upright transparent panel structure includes right and left substantially coextensive half panel sections each including a corresponding support flange section of said support flange means, said half panel sections including elongated guide portions thereof extending longitudinally of said panel structure and disposed in lengthwise lapped guiding engagement with each other for relative shifting of said half panel sections toward and away from each other between retracted limit positions and extended positions, and force means operably connected between said half panel sections yieldingly biasing said half panel sections toward said retracted limit position.

14. In combination, a pair of glasses including front and rear sides, top and bottom margins and upright opposite side margins as well as elongated, rearwardly projecting opposite side temples pivoted at their forward ends from corresponding opposite side margins of said glasses for swinging movement into lengthwise overlapped positions extending across and closely paralleling said rear side, an adjustable sun shade including a horizontally elongated upright transparent panel structure including front and rear surfaces, upper and lower margins and opposite side margins, said panel structure including rearwardly projecting support flange means extending along and projecting rearwardly from said upper margin, said upright transparent panel structure being disposed closely forward of said front side with said support flange means lap engaged over said top margin, the opposite ends of said lower margin including rearwardly projecting flange means closely adjacent said side margins of said transparent panel structure, a pair of upstanding, elongated flexible and elastic retaining members adjacent and rearward of said side margins of said transparent panel structure having upper and lower ends anchored to the corresponding rearwardly projecting flange means, said retaining members being spaced sufficiently rearward of said rear surface to be disposed rearward of the pivot connections between said temples in said glasses, the upper and lower ends of said retaining members being disposed in upstanding planes generally paralleling said temples spaced inward of the remote surfaces of said temples, said retaining members being longitudinally tensioned and outwardly deflected by said temples to thereby exert yielding pressure on said temples to swing the rear ends thereof toward each other and thereby clamp engage the rear ends of the temples against the head of the user of the glasses in order to compensate for the additional weight of the sun shade supported from said glasses.

15. The glasses and sun shade combination of claim 14 wherein said upright transparent panel structure includes right and left substantially coextensive half panel sections each including a corresponding support flange section of said support flange means, said half panel sections including elongated guide portions thereof extending longitudinally of said panel structure and disposed in lengthwise lapped guiding engagement with each other for relative shifting of said half panel sections toward and away from each other between retracted limit positions and extended positions, and force means operably connected between said half panel sections yieldingly biasing said half panel sections toward said retracted limit position.

16. The combination of claim 15 wherein said retaining members, at least in the areas thereof engageable with said temples, include friction surface means for non-slip frictional engagement with said temples.

* * * * *